USS009619040B2

(12) United States Patent
Sueishi et al.

(10) Patent No.: US 9,619,040 B2
(45) Date of Patent: Apr. 11, 2017

(54) OPERATION DEVICE AND DISPLACEMENT ADJUSTMENT METHOD

(71) Applicant: KYOCERA Document Solutions Inc., Osaka (JP)

(72) Inventors: Naoki Sueishi, Osaka (JP); Rie Tezuka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 87 days.

(21) Appl. No.: 14/673,672

(22) Filed: Mar. 30, 2015

(65) Prior Publication Data

US 2015/0277576 A1 Oct. 1, 2015

(30) Foreign Application Priority Data

Mar. 31, 2014 (JP) ................................. 2014-073746

(51) Int. Cl.
| | | |
|---|---|---|
| *G06F 3/045* | (2006.01) | |
| *G06F 3/01* | (2006.01) | |
| *G06F 1/32* | (2006.01) | |
| *G06F 3/041* | (2006.01) | |
| *G03G 15/00* | (2006.01) | |

(52) U.S. Cl.
CPC ......... *G06F 3/017* (2013.01); *G03G 15/5016* (2013.01); *G03G 15/5091* (2013.01); *G06F 1/3231* (2013.01); *G06F 1/3284* (2013.01); *G06F 3/045* (2013.01); *G06F 3/0418* (2013.01); *G06F 3/016* (2013.01)

(58) Field of Classification Search
CPC ... H04N 1/00411; G06F 3/017; G06F 1/3231; G06F 3/045; G06F 1/3284; G06F 3/0418; G06F 3/016; G03G 15/55
See application file for complete search history.

(56) References Cited

U.S. PATENT DOCUMENTS

| | | | | |
|---|---|---|---|---|
| 2008/0225017 A1* | 9/2008 | Kim | ...................... | G06F 3/0421 |
| | | | | 345/175 |
| 2008/0230497 A1* | 9/2008 | Strickland | ............... | G09F 27/00 |
| | | | | 211/26 |
| 2012/0127538 A1* | 5/2012 | Mamiya | ................ | G06F 1/3231 |
| | | | | 358/442 |

(Continued)

FOREIGN PATENT DOCUMENTS

| | | |
|---|---|---|
| JP | 2003-330618 A | 11/2003 |
| JP | 2003330618 A * | 11/2003 |
| JP | 2012-118850 A | 6/2012 |

*Primary Examiner* — Kumar Patel
*Assistant Examiner* — Amy C Onyekaba
(74) *Attorney, Agent, or Firm* — Stein IP, LLC

(57) ABSTRACT

An operation device has a resistive-film touch panel, a human detector, a vibrator, and a displacement adjustor. The human detector detects human presence near the device by using a human sensor. The vibrator vibrates a piezoelectric element previously provided at an edge of the touch panel when human presence is detected near the device, to set a predetermined point on the touch panel to which the resulting vibration conducts as a virtual touch point. The displacement adjustor adjusts a displacement by making a measured position value corresponding to the virtual touch point equal to a previously set reference position value corresponding to the touch point.

4 Claims, 7 Drawing Sheets

(56) References Cited

U.S. PATENT DOCUMENTS

| | | | |
|---|---|---|---|
| 2012/0137154 A1* | 5/2012 | Azuma | G03G 15/5004 713/323 |
| 2013/0128298 A1* | 5/2013 | Yamada | G06K 15/02 358/1.13 |
| 2014/0002844 A1* | 1/2014 | Miyamoto | G06K 15/4055 358/1.13 |
| 2014/0153031 A1* | 6/2014 | Toyamasaki | G07C 9/00 358/1.14 |

* cited by examiner

OPERATION DEVICE AND DISPLACEMENT ADJUSTMENT METHOD

INCORPORATION BY REFERENCE

This application is based upon and claims the benefit of priority from the corresponding Japanese Patent Application No. 2014-073746 filed on Mar. 31, 2014, the entire contents of which are incorporated herein by reference.

BACKGROUND OF THE INVENTION

The present disclosure relates to an operation device and a displacement adjustment method. More particularly, the present disclosure relates to an operation device and a displacement adjustment method that permits automatic displacement adjustment when a user uses a touch panel.

On an image forming apparatus, such as an electronic copier, that is furnished with multiple functions like an automatic document feed function, a facsimile exchange function, a scanner function, and a printer function, irrespective of which of those functions is being used, an operation panel keeps being operated. That is, the operation panel is used constantly.

Operation panels for incorporation in the operation section of image forming apparatuses, i.e., touch panels, are roughly classified into a capacitive type and a resistive-film type. In particular, the resistive-film type has long been in practical use, and has been used in numerous image forming apparatuses.

The resistive-film type has the following advantages among others: the hardware is inexpensive; it does not require a complicated algorithm to realize the function of a touch panel; it does not require high-performance ICs (integrated circuits) and components in the input interface and control circuitry; and the power consumption is small.

A touch panel of the resistive-film type is composed of a flexible film in the topmost layer disposed over a transparent substrate of glass or the like, and the reverse side of the film and the obverse side of the substrate are typically coated with a electrically conductive transparent film of ITO (indium tin oxide). Between the film and the substrate, "dots," which are spacers of an electrically insulating material, are arrayed at predetermined intervals across the plane, so that a gap is left between the film an the substrate. When a user, with a finger or a stylus, presses the film from above the touch panel, at the point of the touch, the film makes contact with the electrically conductive transparent film on the inner side of the substrate, and this permits the pressed (touched) position to be identified.

On the disadvantageous side, a touch panel of the resistive-film type is liable to be influenced by EMI (electromagnetic interference) and humidity, and suffers from the analogue sensor output value varying with temperature and time. As a solution, conventionally, a change in the environment is coped with by performing calibration with no input so as to compensate for a displacement of the reference position (origin) with no input.

For example, a terminal device is known which includes a first input device for detecting a position or a specified quantity based on a user operation and a second input device for detecting presence of an object approaching the first input device. This terminal device is characterized by the provision of a controller which performs automatic calibration of the first input device, and which, when the second input device detects presence of an object approaching the first input device during the automatic calibration, stops the automatic calibration of the first input device. Thus, it is possible to prevent failure of automatic calibration due to the user making an operation during automatic calibration.

On the other hand, as a technology involving vibration applied to a touch panel, an input method is known which comprises a detection step of detecting approach or contact by a living body or an object within a predetermined detection range, a vibration step of causing vibration momentarily in response to detection of approach in the detection step, and an input step of performing a predetermined input process in response to detection of contact in a predetermined state in the detection step. Thus, immediately before a user touches the panel, he can see, by momentary vibration, that he can make an input by touching the position; the user can thus operate the touch panel reliably.

SUMMARY OF THE INVENTION

According to one aspect of the present disclosure, an operation device includes a touch panel of a resistive-film type, and further includes a human detector, a vibrator, and a displacement adjuster. The human detector detects whether or not a human is present near the device by use of a human sensor. The vibrator vibrates a piezoelectric element previously provided at an edge of the touch panel when a human is detected to be present near the device, in order to set a predetermined point on the touch panel to which the resulting vibration is conducts as a virtual touch point. The displacement adjustor adjusts a displacement by making a measured position value corresponding to the virtual touch point equal to a previously set reference position value corresponding to the touch point.

According to another aspect of the present disclosure, a method of adjusting a displacement on an operation device including a touch panel of a resistive-film type includes the steps of: detecting whether or not a human is present near the device by use of a human sensor; vibrating a piezoelectric element previously provided at an edge of the touch panel when a human is detected to be present near the device, in order to set a predetermined point on the touch panel to which the resulting vibration conducts as a virtual touch point; and adjusting a displacement by making a measured position value corresponding to the virtual touch point equal to a previously set reference position value corresponding to the touch point.

Further features and advantages of the present disclosure will become apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Hereinafter, with reference to the accompanying drawings, an image forming apparatus incorporating an operation device (operation section) embodying the present disclosure and a displacement adjustment method embodying the present disclosure will be described to ease the understanding of the present disclosure. The embodiments presented below are all merely examples of how the present disclosure can be implemented and are in no way meant to limit the technical scope of the present disclosure. In a flow chart, the letter "S" preceding numbers stands for "Step."

Figure 1:
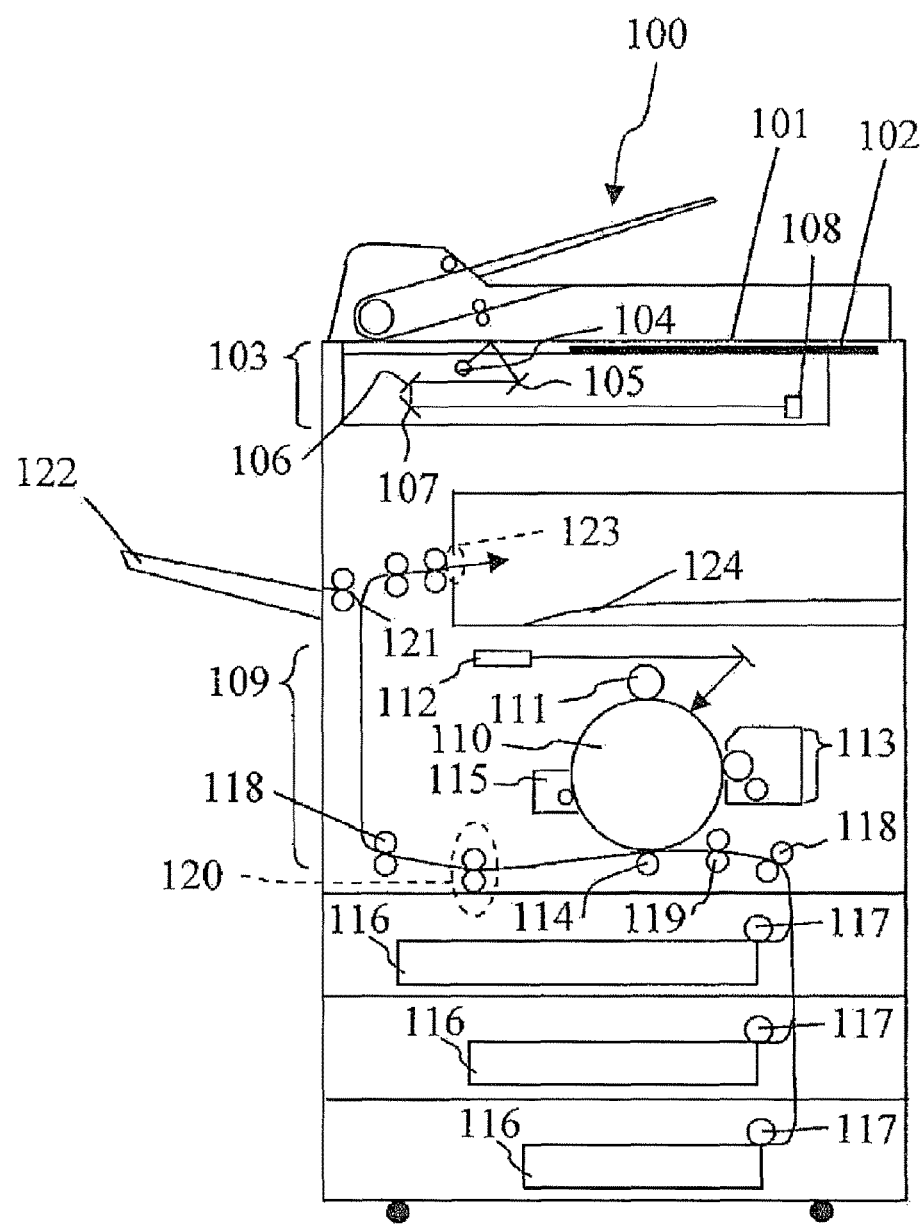
FIG. 1 is a conceptual diagram of an image forming apparatus incorporating an operation section embodying the present disclosure.

Image Forming Apparatus Incorporating an Operation Section: FIG. 1 is a conceptual diagram of an image forming apparatus incorporating an operation section embodying the present disclosure. It should be noted that such parts as are not essential in the present disclosure are omitted from illustration.

An image forming apparatus incorporating an operation section embodying the present disclosure can be a dedicated printer, a dedicated scanner, or a multifunction peripheral or the like which has integrated functions of a printer, copier, scanner, facsimile machine, etc. An image forming apparatus incorporating an operation section embodying the present disclosure thus functions as an image forming apparatus provided with a copier function, a scanner function, a facsimile function, a printer function, etc.

Now, how a multifunction peripheral 100 (MFP) operates when, for example, a copier function is used will be described briefly.

When using the multifunction peripheral 100, a user places a document on a document stage 101 provided on the top face of a cabinet. The user then operates an operation section 102 (operation panel) provided near the document stage 101 to enter, via the operation section 102, settings related to image formation. The user then presses a START key provided on the operation section 102 so that the multifunction peripheral 100 starts image formation (printing).

Then, in an image reading section 103, light emitted from a light source 104 is reflected on the document placed on the document stage 101. The reflected light is directed by mirrors 105, 106, and 107 to an image sensor 108. The directed light is subjected to photoelectric conversion by the image sensor 108, which thereby produces image data corresponding to the document.

Based on the image data, a toner image is formed by an image forming section 109. The image forming section 109 includes a photosensitive drum 110. The photosensitive drum 110 rotates at a constant speed in a predetermined direction, and around it, there are provided, from the upstream side with respect to the rotation direction, a charging unit 111, an exposing unit 112, a developing unit 113, a transferring unit 114, a cleaning unit 115, etc.

The charging unit 111 charges the surface of the photosensitive drum 110 with electric charge uniformly. The exposing unit 112 irradiates the electrically charged surface of the photosensitive drum 110 with a laser beam based on the image data to form an electrostatic latent image. The developing unit 113 attaches toner to the thus formed electrostatic latent image to form a toner image. The formed toner image is transferred by the transferring unit 114 to a recording medium (e.g., a sheet of paper or other material). The cleaning unit 115 removes excess toner that is left behind on the surface of the photosensitive drum 110. This sequence of processes proceeds as the photosensitive drum 110 rotates.

Sheets are transported from a plurality of sheet feed cassettes 116 provided in the multifunction peripheral 100. A sheet is picked up by a pickup roller 117 out of one of the sheet feed cassettes 116 to be fed into a transport passage. Each sheet feed cassette 116 contains a different type of sheets, and a particular type of sheets are fed out according to the settings related to image formation.

A sheet fed into the transport passage is fed by transport rollers 118 and registration rollers 119 to between the photosensitive drum 110 and the transferring unit 114. There, the sheet has the toner image transferred to it by the transferring unit 114, and is then transported on to a fusing device 120.

As the sheet having the toner image transferred to it passes between a heating roller and a pressing roller provided in the fusing device 120, the toner image is exposed to heat and pressure, and is thereby fused as a visible image to the sheet. The amount of heat exerted by the heating roller is optimized according to the type of sheet so as to achieve proper fusing. With the fusing of the visible image to the sheet, image formation comes to an end. The sheet is then fed by transport rollers 118 to a path switcher 121.

The path switcher 121 directs the sheet, according to a switch instruction from the multifunction peripheral 100, either to a sheet discharge tray 122 provided on a side face of the cabinet or via a sheet discharge port 123 to an inner tray 124 provided inside the cabinet. The sheet is stacked and stored on the sheet discharge tray 122 or on the inner tray 124. Through the procedure described thus far, the multifunction peripheral 100 provides the user with a copier function.

Figure 2:
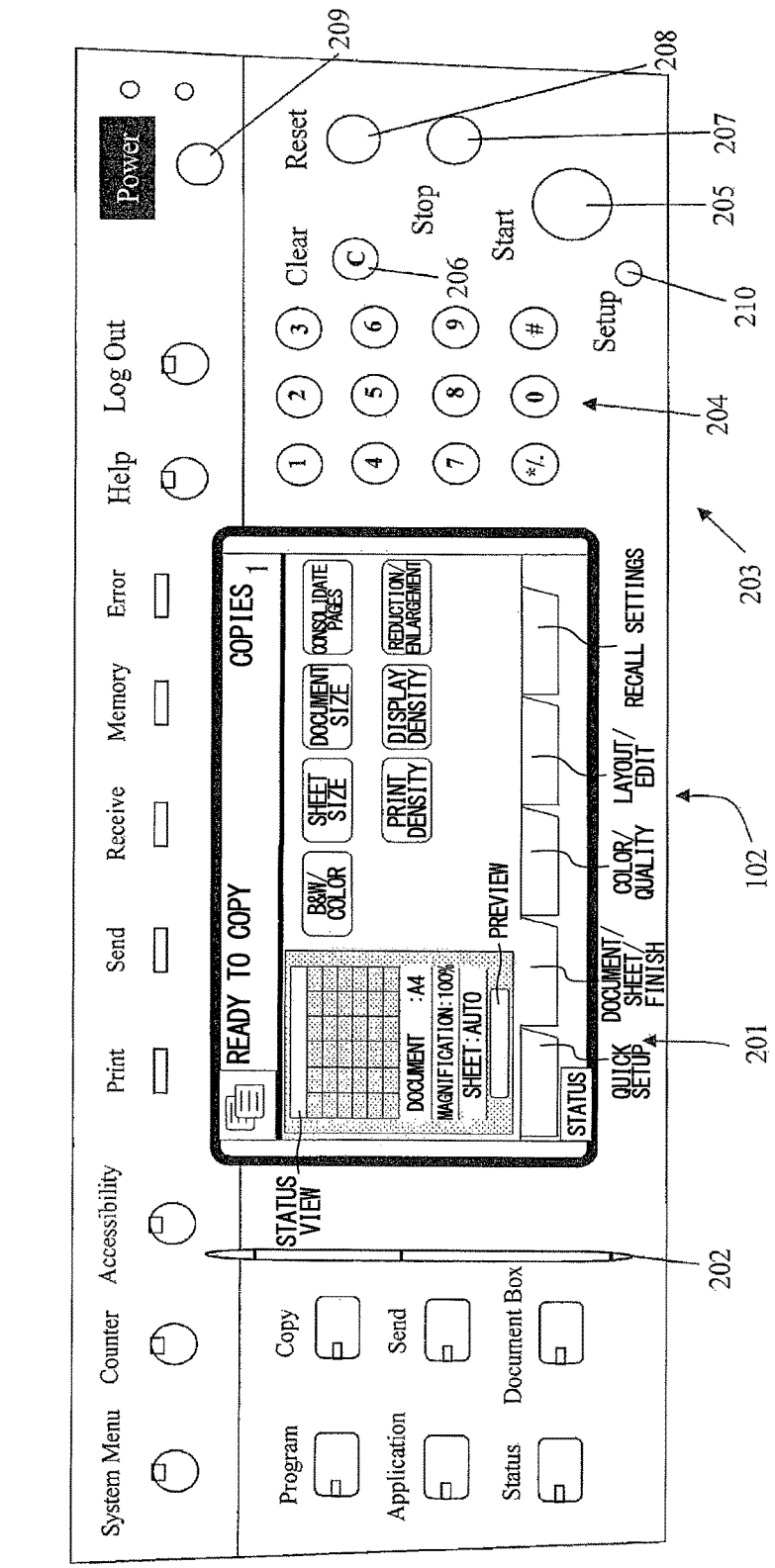
FIG. 2 is a conceptual diagram showing an overall configuration of an operation section embodying the present disclosure.

FIG. 2 is a conceptual diagram showing an overall configuration of an operation section according to the present disclosure. By operating the operation section 102, the user can enter settings related to image formation and confirm the entered settings. The user can enter such settings by use of a touch panel 201 (operation panel), a touch pen 202, and operation keys 203 provided in the operation section 102.

The touch panel 201 has the function of accepting entry of settings and the function of displaying those settings. Specifically, pressing keys within a screen displayed on the touch panel 201 permits the setting corresponding to the pressed keys to be entered.

On the rear face of the touch panel 201, a display such as an LCD (liquid crystal display) is provided. The display displays, for example, operation screens such as an initial screen. Near the touch panel 201, the touch pen 202 is provided. When the user touches the touch panel 201 at the tip of the touch pen 202, a sensor provided behind the touch panel 201 senses the location of the touch.

The touch panel 201 is a touch panel of a resistive-film type, and incorporates a piezoelectric element at an edge of its rear face. The touch panel 201 is so configured that, in response to a touch on it by the user, the piezoelectric element vibrates as necessary (as will be discussed later).

Also provided near the touch panel 201 are a predetermined number of operation keys 203, including, for example, numerical keys 204, a START key 205, a CLEAR key 206, a STOP key 207, a RESET key 208, and a POWER key 209.

Figure 3:
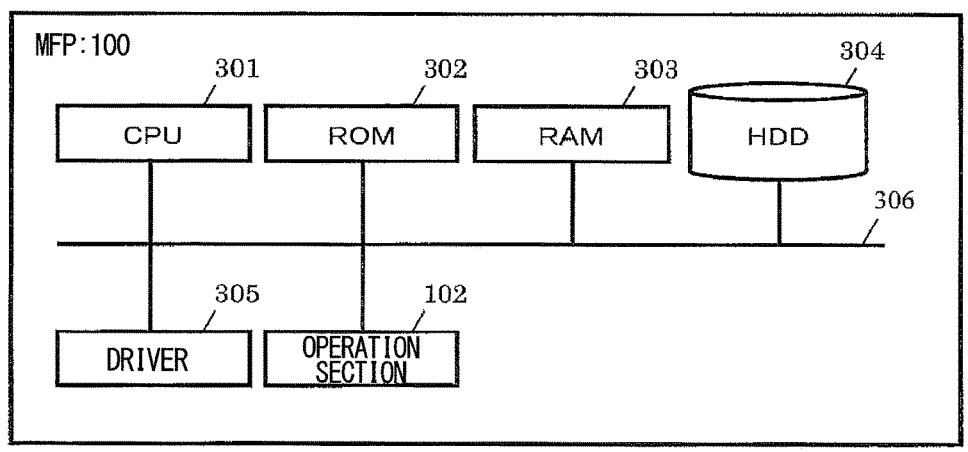
FIG. 3 is a diagram showing a configuration of control hardware of a multifunction peripheral embodying the present disclosure.

Next, with reference to FIG. 3, the configuration of the control system hardware of the multifunction peripheral 100 will be described. FIG. 3 is a diagram showing a configuration of the control system hardware of the multifunction peripheral 100 embodying the present disclosure. It should be noted that such parts as are not essential in the present disclosure are omitted from illustration.

The control circuitry of the multifunction peripheral 100 includes a CPU (central processing unit) 301, a ROM (read-only memory) 302, a RAM (random-access memory) 303, a HDD (hard disk drive) 304, a driver 305 for driving driven portions, and the operation section 102, and these are interconnected across an internal bus 306.

The CPU 301 uses, for example, the RAM 303 as a work area, executes programs stored on the ROM 302, the HDD 304, etc., exchanges with the driver 305 and the operation section 102 data, instructions, signals corresponding keys, commands, etc., and controls the operation of the driven portions shown in FIG. 1. The control circuitry of the operation section 102 is equivalent to the control circuitry of the multifunction peripheral 100, and therefore will not be separately illustrated or described.

There are also portions (shown in FIG. 4), other than the driven portions mentioned above, that are realized by the CPU of the multifunction peripheral 100 and the operation section 102 executing programs. In the ROM, the HDD, etc., there are stored programs and data for realizing the portions described below.

Figure 4:
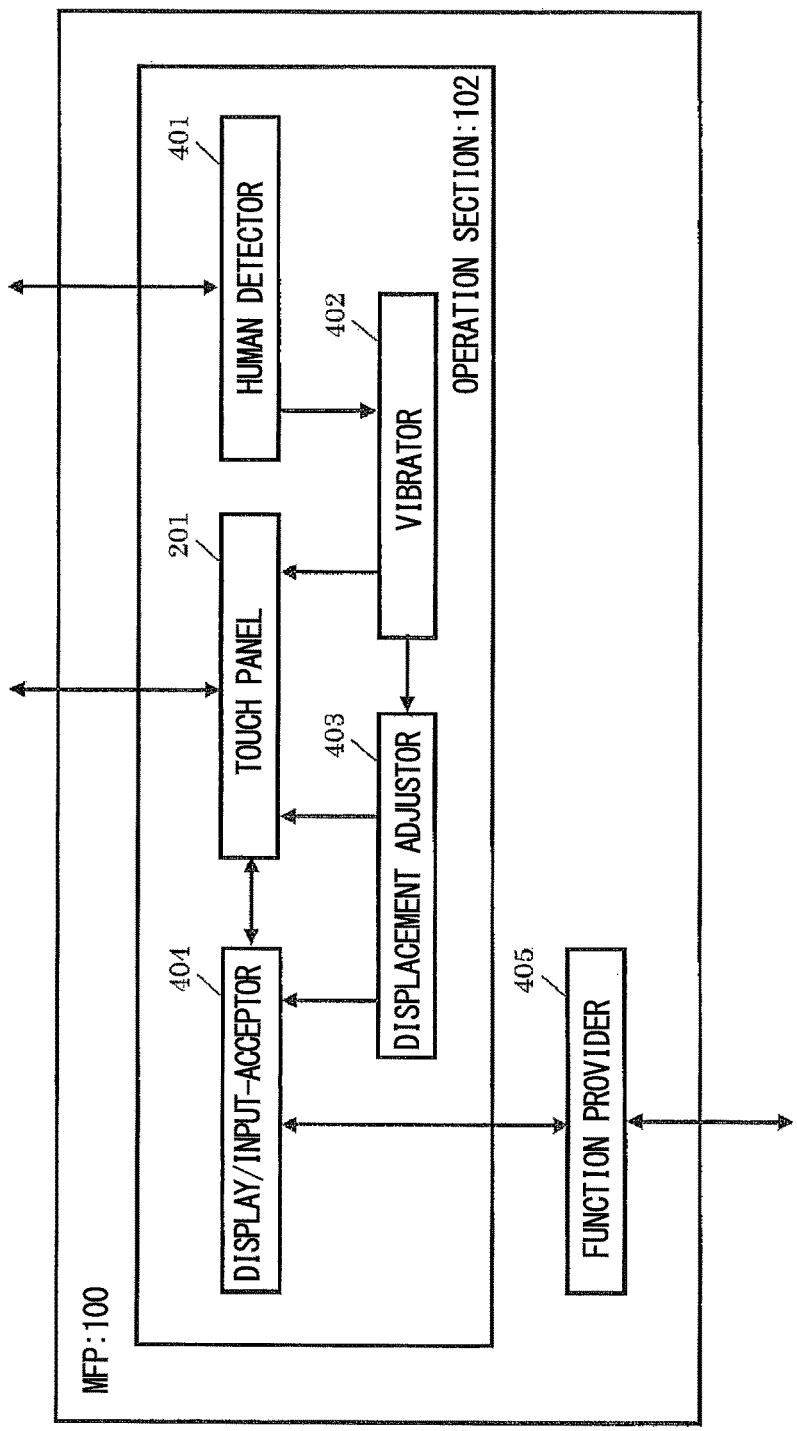
FIG. 4 is a functional block diagram of a multifunction peripheral embodying the present disclosure.
Figure 5:
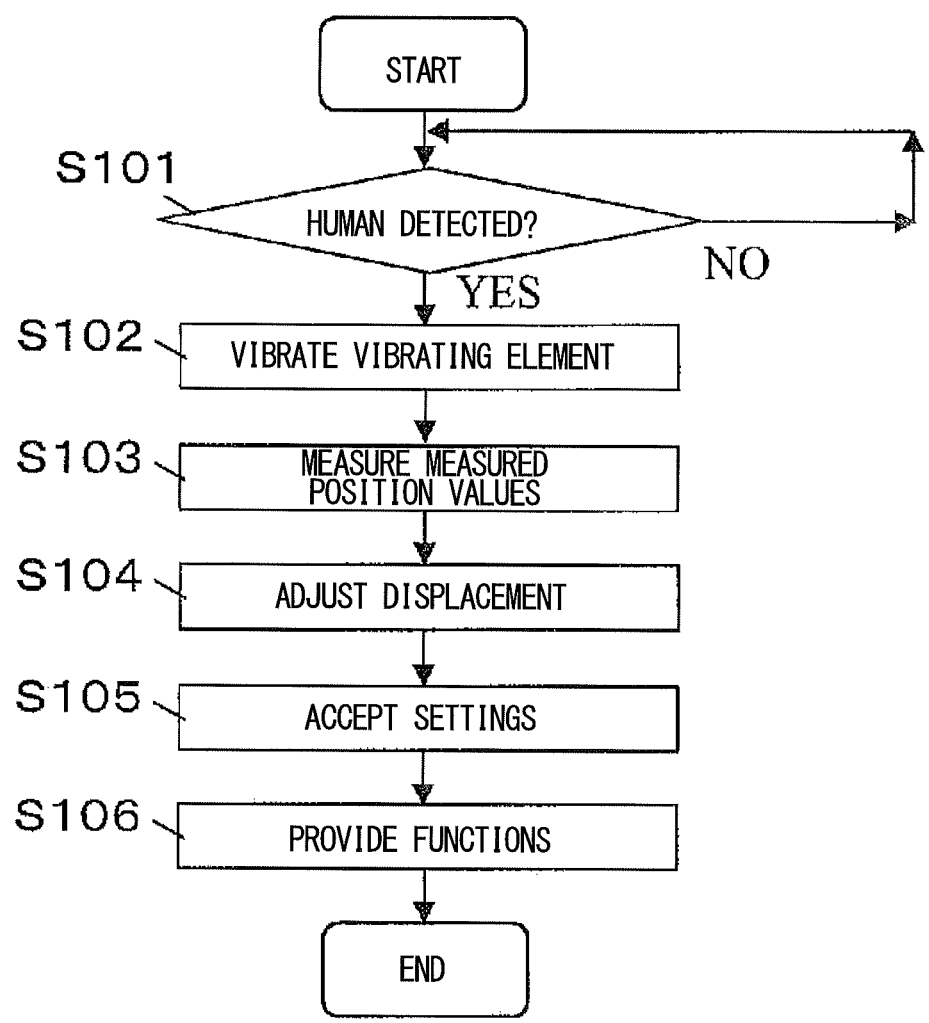
FIG. 5 is a flow chart showing an execution procedure embodying the present disclosure.

Embodiment of the Present Disclosure: Now, with reference to FIGS. 4 and 5, a configuration and an execution procedure embodying the present disclosure will be described. FIG. 4 is a functional block diagram of a multifunction peripheral embodying the present disclosure. FIG. 5 is a flow chart showing an execution procedure embodying the present disclosure.

When the multifunction peripheral 100, after the lapse of a predetermined length of time after being started up, goes into a sleep state, a human detector 401 in the operation section 102 of the multifunction peripheral 100 detects, by use of a human sensor provided in the operation section 102, whether or not a human is present near the operation section 102 (FIG. 5, S101).

Figure 6A:
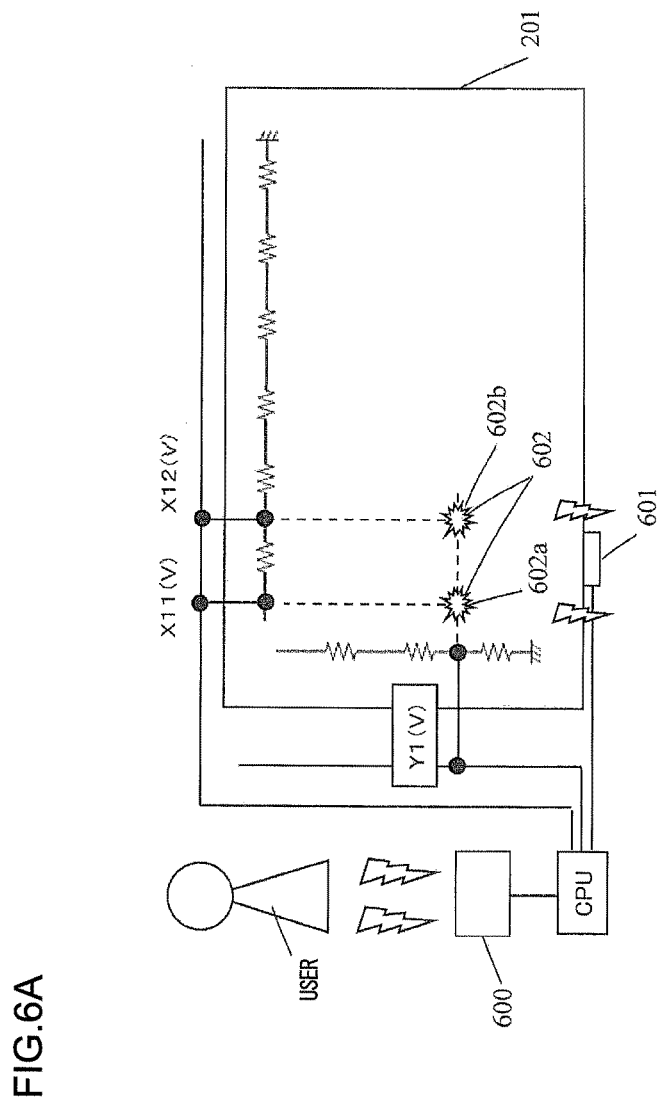
FIG. 6A is a conceptual diagram of a configuration of a touch panel embodying the present disclosure.

The monitoring of human presence by the human detector 401 can be achieved in any manner; it can be achieved, for example, in the following manner. As shown in FIG. 6A, near the resistive-film touch panel 201 in the operation section 102, a human sensor 600 is previously provided which has a detection area in front of (to the front of) the touch panel 201, and the human detector 401 activates the human sensor 600 to detect whether or not a human has entered the detection area of the human sensor 600. The human sensor 600 can be any sensor that can detect human presence; for example, a pyroelectric infrared sensor, which has a wide detection area, can be adopted. It is preferable that the human sensor be a one for power-saving control which can be used even with the operation section 102 in a sleep state.

So long as no human is present near the operation section 102, the human detector 401 repeats detecting whether or not a human is present near the operation section 102 unless externally instructed to stop the detection (FIG. 5, "NO" at S101, then back to S101).

When a user, intending to use the multifunction peripheral 100, comes close to the operation section 102, the human detector 401 detects human presence near the operation section 102 (FIG. 5, "YES" at S101), and so notifies a vibrator 402. So notified, the vibrator 402 vibrates a piezoelectric element 601 previously provided at an edge of the touch panel 201 as shown in FIG. 6A, and sets a predetermined point on the touch panel 201 to which the vibration conducts as a virtual touch point (FIG. 5, S102).

The setting of a predetermined point as a virtual touch point by the vibrator 402 is achieved in any manner; it can be achieved, for example, in the following manner. As shown in FIG. 6A, a piezoelectric element 601 is provided at a side edge of the rear face of the touch panel 201; when the piezoelectric element 601 is vibrated, due to the vibration characteristics (frequency, amplitude) of the piezoelectric element 601 and the vibration characteristics (proper oscillation frequency etc.) of the touch panel 201, one or more (e.g., two) predetermined points 602, as if the touch panel 201 were pressed there, appear in the region to which the vibration of the piezoelectric element 601 conducts and which is closest to the piezoelectric element 601. Any such point is set as a virtual touch point 602 on the touch panel 201 resulting from the vibration of the piezoelectric element 601.

In this way, by vibrating the piezoelectric element 601 to generate a virtual touch point 602 on the touch panel 201, it is possible to eliminate the need to provide a mechanical device, such as a free-falling object, for the purpose of displacement adjustment, and thus to prevent generation of annoying noise.

Since the piezoelectric element 601 is arranged inside the operation section 102, at an edge of the touch panel 201, it can be hidden from the user's sight.

When the vibrator 402 vibrates the piezoelectric element 601, it so notifies a displacement adjustor 403. So notified, the displacement adjustor 403 adjusts (compensates for) a displacement so that measured position values corresponding to the virtual touch point will be equal to previously set reference position values corresponding to the touch point (FIG. 5, S103 then S104).

Here, the adjustment of a displacement by the displacement adjustor 403 can be achieved in any manner; it can be achieved, for example, in the following manner. When the vibrator 402 vibrates the piezoelectric element 601, a virtual touch point 602 appears on the touch panel 201. The displacement adjustor 403 then measures a measured point corresponding to the touch point 602. Since the touch panel 201 is of a resistive film type, the measured position values of the predetermined touch point 602 comprise a voltage value in the horizontal (left-right) direction and a voltage value in the vertical (up-down) direction. As shown in FIG. 6A, the measured position values of a left-hand touch point 602a close to the piezoelectric element 601 comprise a voltage value (e.g., X11 (V)) in the horizontal direction and a voltage value (e.g., Y1 (V)) in the vertical direction, and the measured position values of a right-hand touch point 602b close to the piezoelectric element 601 comprise a voltage value (e.g., X12 (V)) in the horizontal direction and a voltage value (e.g., Y1 (V)) in the vertical direction. In FIG. 6A, the left- and right-hand touch points 602a and 602b are located side by side in the horizontal direction, and thus they have an equal voltage value (Y1 (V)) in the vertical direction.

Figure 6B:
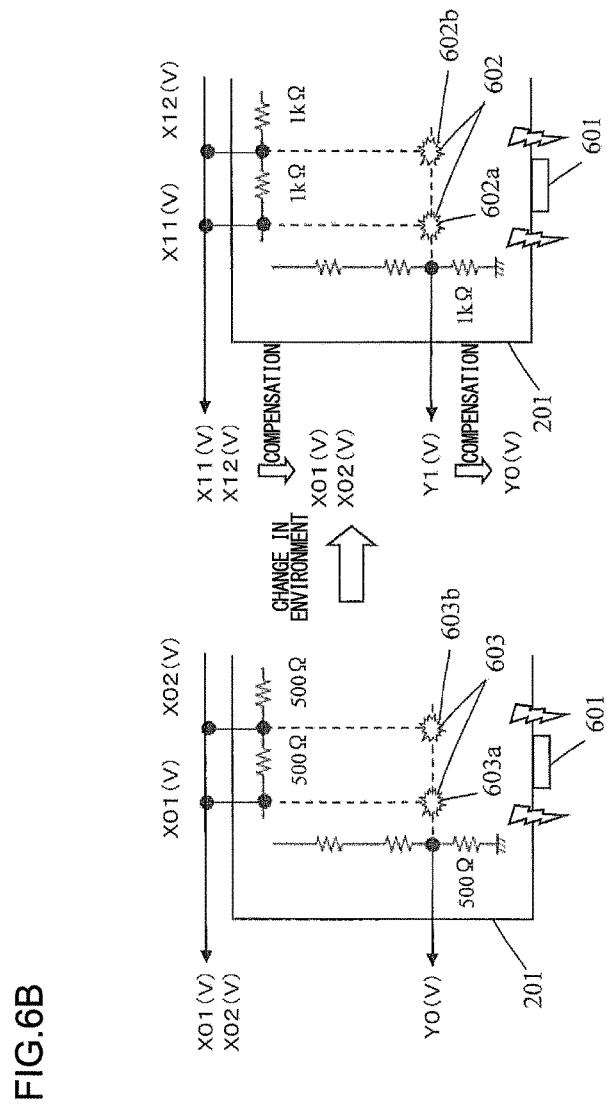
FIG. 6B is a diagram showing an example of displacement adjustment embodying the present disclosure.

Here, resistance values inside the touch panel 201 vary with the ambient temperature and humidity, and thus the measured position values of a touch point 602 vary from one time to another. For example, as shown in FIG. 6B, although the position of a touch point 603 that appears as a result of the piezoelectric element 601 vibrating at one time and the position of a touch point 603 that appears as a result of the piezoelectric element 601 vibrating at another, later time, and hence in a changed environment, are identical, they yield different measured position values due to variations in the resistance values relied on for position detection.

Specifically, at installation or shipment of the touch panel 201, the reference position values of the left-hand touch point 603a close to the piezoelectric element 601 comprise a voltage value (e.g., X01 (V)) in the horizontal direction and a voltage value (e.g., Y0 (V)) in the vertical direction, and the reference position values of the right-hand touch point 603b close to the piezoelectric element 601 comprise a voltage value (e.g., X02 (V)) in the horizontal direction and a voltage value (e.g., Y0 (V)) in the vertical direction.

When, due to a change in the environment, the resistance values each change from 500Ω to 1 kΩ, then, as described above, the measured position values of the left-hand touch point 602a close to the piezoelectric element 601 change to (X11 (V), Y1 (V)) and the measured position values of the right-hand touch point 602a close to the piezoelectric element 601 change to (X12 (V), Y1 (V)). The differences between the reference position values and the measured position values constitute a displacement on the touch panel 201.

As a remedy, the reference position values of the touch point 603 that is set for the first time are previously stored in a predetermined part of memory; when the piezoelectric element 601 is vibrated, the displacement adjustor 403 measures the measured position values corresponding to the virtual touch point 602 (FIG. 5, S103), divides the measured position values (e.g., 2.4 V) by the above-mentioned reference position values in the memory (e.g., 2.0 V), and takes the reciprocal of the quotient (i.e., 1.2) as a compensation coefficient (i.e., 0.833). The displacement adjustor 403 then multiplies the measured position values by the compensation coefficient, and thereby adjusts the displacement so that the measured position values will be equal to the reference position values (FIG. 5, S104). In this way, even when the resistance values vary, a corresponding compensation coefficient is set, so that measured position values corresponding to the user's future touch points can be detected as proper measured position values in relation to reference position values (default values). Moreover, when a user comes close to the operation section 102, displacement adjustment is performed automatically; thus the user can use the operation section 102 without a wait. It is thus possible to reliably provide an operation section 102 free from a displacement.

Although in the embodiment disclosed herein, displacement adjustment is performed by use of a compensation coefficient, this is not meant as any limitation; any well-known method for displacement adjustment may instead be adopted.

When the displacement adjustor 403 completes displacement adjustment, it so notifies a display/input-acceptor 404. So notified, the display/input-acceptor 404, whenever the user touches the touch panel 201, compensates the measured position values on the touch panel 201 according to the compensation coefficient in order to identify the position of the user's touch point.

When the user touches the touch panel 201 in the operation section 102, the display/input-acceptor 404 accepts the user's touch, restores the operation section 102 and the multifunction peripheral 100 from the sleep state to the operating state where they can offer their functions, and displays an operation screen (initial screen) on the touch panel 201 as shown in FIG. 2.

When the user, while viewing the operation screen, operates keys corresponding to desired settings, the display/input-acceptor 404, now that displacement adjustment has been performed, identifies the user's touch position and accepts settings corresponding to it (FIG. 5, S105). In this way, by performing displacement adjustment before the user starts to operate keys on the touch panel 201, it is possible to identify the user's settings properly and to accept the settings smoothly.

When the user, while viewing the operation screen, presses the START key 205, in response the display/input-acceptor 404 notifies a function provider 405 accordingly. So notified, the function provider 405 provides functions according to the previously accepted settings (FIG. 5, S106). In this way, the user can perform desired functions on the multifunction peripheral 100.

As described above, according to the present disclosure, there are provided a human detector 401 which detects whether or not a human is present near the operation device by use of a human sensor; a vibrator 402 which vibrates a piezoelectric element previously provided at an edge of the touch panel when a human is detected to be present near the device, in order to set a predetermined point on the touch panel to which the resulting vibration conducts as a virtual touch point; and a displacement adjustor 403 which adjusts a displacement by making a measured position value corresponding to the virtual touch point equal to a previously set reference position value corresponding to the touch point.

With this configuration, it is possible to perform displacement adjustment automatically when a user uses the touch panel, and thus the user can operate the touch panel smoothly.

Although the embodiment disclosed herein deals with a case where the operation section 102 is applied to a multifunction peripheral 100, application is possible to any operation devices involving a touch panel of a resistive-film type. The present disclosure achieves the same effect when applied to, for example, any of a variety of image forming apparatuses, image processing apparatuses, image editing apparatuses, image display apparatuses, etc. that include an operation section like the operation section 102 described above.

Although the embodiment disclosed herein deals with a configuration where the operation section 102 and the multifunction peripheral 100 include different portions, a configuration is also possible where programs that realize those portions are stored in a storage medium and this storage medium is offered. With this configuration, the programs are read by the operation section 102 or the multifunction peripheral 100, which thereby realize the above-mentioned portions. In that case, the very programs read out from the recording medium provide the workings and benefits of the present disclosure. It is also possible to offer the steps to be executed by the respective portions in a form stored on a hard disk.

The embodiment disclosed herein can be offered as programs to be executed on a computer that are individually distributed across a telephone communication network. In that case, according to programs embodying the present disclosure, the central processing unit (CPU) realizes control operation in concert with other circuitry. The portions realized with the programs and the CPU can be configured as hardware. The programs can be distributed in a form recorded on a computer-readable recording medium such as a CD-ROM.

An operation device and a displacement adjustment method embodying the present disclosure are useful not only in operation sections but also in multifunction peripherals, copiers, printers, etc. that include an operation section, and are effective as an operation device and a displacement adjustment method that achieve automatic displacement adjustment when a user uses a touch panel.

What is claimed is:

1. An operation device including a touch panel of a resistive-film type, comprising:
   a human sensor having a detection area near the touch panel;
   a piezoelectric element provided at an edge of the touch panel to vibrate; and
   a control circuit connected to the human sensor and the piezoelectric element,
   Wherein:
   the control circuit makes the piezoelectric element vibrate, when the human sensor detects a human to be present near the device, in order to set a predetermined point on the touch panel to which resulting vibration conducts as a virtual touch point, and the control circuit adjusts a displacement by making a measured position value corresponding to the virtual touch point equal to a previously set reference position value corresponding to the touch point.

2. The operation device according to claim 1,
   wherein the human sensor is a pyroelectric infrared sensor for power-saving control.

3. The operation device according to claim 1, wherein the virtual touch point is a predetermined point on the touch panel in a region to which the piezoelectric element conducts vibration and which is closest to the piezoelectric element, and the control circuit adjusts the displacement based on a measured position value corresponding to the touch point in the region closest to the piezoelectric element and a reference position value corresponding to the touch point.

4. A method of adjusting a displacement on an operation device including a touch panel of a resistive-film type, the method comprising:
   detecting presence of a human near the device by use of a human sensor;
   vibrating a piezoelectric element previously provided at an edge of the touch panel when the human is detected to be present near the device, in order to set a predetermined point on the touch panel to which resulting vibration conducts as a virtual touch point; and
   adjusting a displacement by making a measured position value corresponding to the virtual touch point equal to a previously set reference position value corresponding to the touch point.

* * * * *